(12) United States Patent
Lee et al.

(10) Patent No.: US 11,615,012 B2
(45) Date of Patent: Mar. 28, 2023

(54) PREPROCESSING IN DATABASE SYSTEM WORKLOAD CAPTURE AND REPLAY

(71) Applicant: SAP SE, Walldorf (DE)

(72) Inventors: Juchang Lee, Seoul (KR); Myunggon Park, Seoul (KR); Jihwan Lim, Seoul (KR); YoungSeok Hwang, Seoul (KR)

(73) Assignee: SAP SE, Walldorf (DE)

( * ) Notice: Subject to any disclaimer, the term of this patent is extended or adjusted under 35 U.S.C. 154(b) by 252 days.

(21) Appl. No.: 16/984,303

(22) Filed: Aug. 4, 2020

(65) Prior Publication Data

US 2021/0311851 A1 Oct. 7, 2021

Related U.S. Application Data

(60) Provisional application No. 63/004,554, filed on Apr. 3, 2020.

(51) Int. Cl.
| | | |
|---|---|---|
| *G06F 11/00* | (2006.01) | |
| *G06F 11/34* | (2006.01) | |
| *G06F 16/17* | (2019.01) | |
| *G06F 16/185* | (2019.01) | |

(52) U.S. Cl.
CPC ...... *G06F 11/3414* (2013.01); *G06F 11/3466* (2013.01); *G06F 16/1734* (2019.01); *G06F 16/185* (2019.01)

(58) Field of Classification Search
None
See application file for complete search history.

(56) References Cited

U.S. PATENT DOCUMENTS

| | | | |
|---|---|---|---|
| 6,086,617 A | 7/2000 | Waldon et al. | |
| 7,168,065 B1 | 1/2007 | Naccache et al. | |
| 7,305,421 B2 | 12/2007 | Cha et al. | |
| 7,930,274 B2 | 4/2011 | Hwang et al. | |
| 8,024,299 B2 * | 9/2011 | Dias ................. | G06F 16/20 707/804 |
| 8,046,334 B2 | 10/2011 | Hwang et al. | |
| 8,442,962 B2 | 5/2013 | Lee et al. | |
| 8,504,691 B1 | 8/2013 | Tobler | |
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |
| 8,918,436 B2 | 12/2014 | Yoon et al. | |

(Continued)

FOREIGN PATENT DOCUMENTS

EP 3171271 5/2017

OTHER PUBLICATIONS

Google Scholar/Patents searches—text refined (Year: 2022).*
Google Scholar/Patents search—text refined (Year: 2022).*

(Continued)

*Primary Examiner* — Christopher S McCarthy
(74) *Attorney, Agent, or Firm* — Fish & Richardson P.C.

(57) ABSTRACT

Methods, systems, and computer-readable storage media for receiving a capture file, the capture file including data representative of a workload executed in a source database system, and processing the capture file to provide a replay file, the replay file being in a format that is executable by a replayer to replay the workload in a target database system, processing the capture file including: processing the capture file to provide a set of intermediate files, and processing the set of intermediate files using in-memory merge sort operations to generate a set of replay files.

17 Claims, 11 Drawing Sheets

(56) References Cited

U.S. PATENT DOCUMENTS

| | | |
|---|---|---|
| 8,935,205 B2 | 1/2015 | Hildenbrand et al. |
| 9,009,182 B2 | 4/2015 | Renkes et al. |
| 9,037,677 B2 | 5/2015 | Lee et al. |
| 9,063,969 B2 | 6/2015 | Lee et al. |
| 9,098,522 B2 | 8/2015 | Lee et al. |
| 9,119,056 B2 | 8/2015 | Hourani et al. |
| 9,165,010 B2 | 10/2015 | Faerber et al. |
| 9,171,020 B2 | 10/2015 | Faerber et al. |
| 9,336,262 B2 | 5/2016 | Lee et al. |
| 9,336,284 B2 | 5/2016 | Lee et al. |
| 9,361,340 B2 | 6/2016 | Jeong et al. |
| 9,465,829 B2 | 10/2016 | Faerber et al. |
| 9,465,843 B2 | 10/2016 | Yoon et al. |
| 9,465,844 B2 | 10/2016 | Faerber et al. |
| 9,483,516 B2 | 11/2016 | Lee et al. |
| 9,501,502 B2 | 11/2016 | Lee et al. |
| 9,558,229 B2 | 1/2017 | Lee et al. |
| 9,558,258 B2 | 1/2017 | Yoon et al. |
| 9,594,799 B2 | 3/2017 | Faerber et al. |
| 9,619,514 B2 | 4/2017 | Mindnich et al. |
| 9,635,093 B2 | 4/2017 | Lee et al. |
| 9,720,949 B2 | 8/2017 | Lee et al. |
| 9,720,992 B2 | 8/2017 | Lee et al. |
| 9,740,715 B2 | 8/2017 | Faerber et al. |
| 9,792,318 B2 | 10/2017 | Schreter et al. |
| 9,798,759 B2 | 10/2017 | Schreter et al. |
| 9,805,074 B2 | 10/2017 | Lee et al. |
| 9,824,134 B2 | 11/2017 | Schreter et al. |
| 9,846,724 B2 | 12/2017 | Weyerhaeuser et al. |
| 9,892,163 B2 | 2/2018 | Kim et al. |
| 2002/0015829 A1 | 2/2002 | Kim |
| 2002/0191797 A1 | 12/2002 | Perlman |
| 2003/0061537 A1 | 3/2003 | Cha et al. |
| 2005/0099960 A1 | 5/2005 | Boss et al. |
| 2005/0262512 A1 | 11/2005 | Schmidt et al. |
| 2007/0136324 A1 | 6/2007 | Xu et al. |
| 2008/0033914 A1 | 2/2008 | Cherniack et al. |
| 2008/0065670 A1 | 3/2008 | Cha et al. |
| 2008/0091806 A1 | 4/2008 | Shen et al. |
| 2008/0097960 A1 | 4/2008 | Dias et al. |
| 2008/0098003 A1* | 4/2008 | Dias .................. G06F 16/217 |
| 2009/0070330 A1 | 3/2009 | Hwang et al. |
| 2009/0254774 A1 | 10/2009 | Chamdani et al. |
| 2010/0205323 A1 | 8/2010 | Barsness et al. |
| 2011/0161300 A1 | 6/2011 | Hwang et al. |
| 2011/0276550 A1 | 11/2011 | Colle et al. |
| 2011/0302226 A1 | 12/2011 | Abadi et al. |
| 2012/0005174 A1* | 1/2012 | Vora .................. G06F 11/3684 |
| | | 707/703 |
| 2012/0084273 A1 | 4/2012 | Lee et al. |
| 2012/0084274 A1 | 4/2012 | Renkes et al. |
| 2012/0150913 A1 | 6/2012 | De Smet et al. |
| 2012/0166407 A1 | 6/2012 | Lee et al. |
| 2012/0167098 A1 | 6/2012 | Lee et al. |
| 2012/0173515 A1 | 7/2012 | Jeong et al. |
| 2012/0216244 A1 | 8/2012 | Kumar |
| 2012/0221513 A1 | 8/2012 | Papadomanolakis et al. |
| 2012/0221519 A1 | 8/2012 | Papadomanolakis et al. |
| 2013/0042003 A1 | 2/2013 | Franco et al. |
| 2013/0124475 A1 | 5/2013 | Hildenbrand et al. |
| 2013/0144866 A1 | 6/2013 | Jerzak |
| 2013/0166534 A1 | 6/2013 | Yoon et al. |
| 2013/0166553 A1 | 6/2013 | Yoon et al. |
| 2013/0166554 A1 | 6/2013 | Yoon et al. |
| 2013/0275457 A1 | 10/2013 | Lee et al. |
| 2013/0275467 A1 | 10/2013 | Lee et al. |
| 2013/0275468 A1 | 10/2013 | Lee et al. |
| 2013/0275550 A1 | 10/2013 | Lee et al. |
| 2013/0290282 A1 | 10/2013 | Faerber et al. |
| 2013/0304714 A1 | 11/2013 | Lee et al. |
| 2014/0006358 A1* | 1/2014 | Wang .................. G06F 16/21 |
| | | 707/687 |
| 2014/0122439 A1 | 5/2014 | Faerber et al. |
| 2014/0122452 A1 | 5/2014 | Faerber et al. |
| 2014/0136473 A1 | 5/2014 | Faerber et al. |
| 2014/0136788 A1 | 5/2014 | Faerber et al. |
| 2014/0149353 A1 | 5/2014 | Lee et al. |
| 2014/0149368 A1 | 5/2014 | Lee et al. |
| 2014/0149527 A1 | 5/2014 | Lee et al. |
| 2014/0156619 A1 | 6/2014 | Lee et al. |
| 2014/0222418 A1 | 8/2014 | Richtarsky et al. |
| 2014/0244628 A1 | 8/2014 | Yoon et al. |
| 2014/0297686 A1 | 10/2014 | Lee et al. |
| 2014/0304219 A1 | 10/2014 | Yoon et al. |
| 2015/0026154 A1 | 1/2015 | Jeong et al. |
| 2015/0074082 A1 | 3/2015 | Yoon et al. |
| 2015/0149409 A1 | 5/2015 | Lee et al. |
| 2015/0149413 A1 | 5/2015 | Lee et al. |
| 2015/0149426 A1 | 5/2015 | Kim et al. |
| 2015/0149442 A1 | 5/2015 | Kim et al. |
| 2015/0149704 A1 | 5/2015 | Lee et al. |
| 2015/0149736 A1 | 5/2015 | Kwon et al. |
| 2015/0178343 A1 | 6/2015 | Renkes et al. |
| 2015/0242400 A1 | 8/2015 | Bensberg et al. |
| 2015/0242451 A1 | 8/2015 | Bensberg et al. |
| 2015/0261805 A1 | 9/2015 | Lee et al. |
| 2015/0347410 A1 | 12/2015 | Kim et al. |
| 2015/0363463 A1 | 12/2015 | Mindnich et al. |
| 2016/0004786 A1 | 1/2016 | Bosman et al. |
| 2016/0042016 A1 | 2/2016 | Faerber et al. |
| 2016/0042028 A1 | 2/2016 | Faerber et al. |
| 2016/0140175 A1 | 5/2016 | Weyerhaeuser et al. |
| 2016/0147617 A1 | 5/2016 | Lee et al. |
| 2016/0147618 A1 | 5/2016 | Lee et al. |
| 2016/0147813 A1 | 5/2016 | Lee et al. |
| 2016/0147814 A1 | 5/2016 | Goel et al. |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al. |
| 2016/0147861 A1 | 5/2016 | Schreter |
| 2016/0147862 A1 | 5/2016 | Schreter |
| 2016/0147906 A1 | 5/2016 | Schreter |
| 2016/0292227 A1 | 10/2016 | Jeong et al. |
| 2016/0364440 A1 | 12/2016 | Lee et al. |
| 2016/0371319 A1 | 12/2016 | Park et al. |
| 2016/0371356 A1 | 12/2016 | Lee et al. |
| 2016/0371357 A1 | 12/2016 | Park et al. |
| 2016/0371358 A1 | 12/2016 | Lee et al. |
| 2016/0378813 A1 | 12/2016 | Yoon et al. |
| 2016/0378826 A1 | 12/2016 | Bensberg et al. |
| 2017/0004158 A1 | 1/2017 | Faerber et al. |
| 2017/0004177 A1 | 1/2017 | Faerber et al. |
| 2017/0068608 A1 | 3/2017 | Covell et al. |
| 2017/0083538 A1 | 3/2017 | Tonder et al. |
| 2017/0097977 A1 | 4/2017 | Yoon et al. |
| 2017/0123877 A1* | 5/2017 | Gongloor ............ G06F 11/3466 |
| 2017/0147628 A1 | 5/2017 | Park et al. |
| 2017/0147638 A1 | 5/2017 | Park et al. |
| 2017/0147639 A1 | 5/2017 | Lee et al. |
| 2017/0147644 A1 | 5/2017 | Lee et al. |
| 2017/0147645 A1 | 5/2017 | Song et al. |
| 2017/0147646 A1 | 5/2017 | Lee et al. |
| 2017/0147671 A1 | 5/2017 | Bensberg et al. |
| 2017/0177658 A1 | 5/2017 | Lee et al. |
| 2017/0177697 A1 | 6/2017 | Lee et al. |
| 2017/0177698 A1 | 6/2017 | Lee et al. |
| 2017/0185642 A1 | 6/2017 | Faerber et al. |
| 2017/0322972 A1* | 11/2017 | Lee .................. G06F 16/137 |
| 2017/0329835 A1 | 11/2017 | Lee et al. |
| 2017/0351718 A1 | 12/2017 | Faerber et al. |
| 2017/0357575 A1 | 12/2017 | Lee et al. |
| 2017/0357576 A1 | 12/2017 | Lee et al. |
| 2017/0357577 A1 | 12/2017 | Lee et al. |
| 2018/0013692 A1* | 1/2018 | Park .................. H04L 67/535 |
| 2018/0074919 A1 | 3/2018 | Lee et al. |
| 2018/0075083 A1 | 3/2018 | Lee et al. |
| 2019/0222658 A1 | 7/2019 | Park et al. |

OTHER PUBLICATIONS

Extended European Search Report issued in European Application No. 20198031.5 dated Mar. 15, 2021, 8 pages.

(56) References Cited

OTHER PUBLICATIONS

Sap.com [online], "SAP HANA Administration with SAP HANA Cockpit" Jan. 2019, [retrieved on Mar. 3, 2021], retrieved from: URL <URL:https://help.sap.com/doc/85e9352c24fc4fcc816-d41524a582b7a/2.11.0.0/en-US/SAP_HANAc_Administration_with_SAP_HANA_Cockpit_en.pdf>, 23 pages.

Extended European Search Report issued in European Application No. 20198392.1 dated Mar. 19, 2021, 12 pages.

Noll et al., "Shared Load(ing): Efficient Bulk Loading into Optimized Storgage" CIDR, Jan. 2020, 10 pages.

Berkeley.edu [online], "Concurrency Control: Locking, Optimistic, Degrees of Consistency," retrieved from https://people.eecs.berkeley.edu/-brewer/cs262/cc.pdf, on or before May 2008, 6 pages.

Binnig et al., "Distributed Snapshot Isolation: Global Transactions Pay Globally, Local Transactions Pay Locally", VLDB J. 23(6): 987-1011 (2014), 25 pages.

Cha et al., "An Extensible Architecture for Main-Memory RealTime Storage Systems", RTCSA : 67-73 (1996), 7 pages.

Cha et al., "An Object-Oriented Model for FMS Control", Intelligent Manufacturing 7(5): 387-391 (1996), 5 pages.

Cha et al., "Cache-Conscious Concurrency Control of MainMemory Indexes on Shared-Memory Multiprocessor Systems", VLDB: 181-190 (2001), 10 pages.

Cha et al., "Efficient Web-Based Access to Multiple Geographic Databases Through Automatically Generated Wrappers", WISE : 34-41 (2000), 8 pages.

Cha et al., "Interval Disaggregate: A New Operator for Business Planning", PVLDB 7(13): 1381-1392 (2014), 12 pages.

Cha et al., "Kaleidoscope Data Model for an English-like Query Language", VLDB: 351-361 (1991), 11 pages.

Cha et al., "Kaleidoscope: A Cooperative Menu-Guided Query Interface", SIGMOD Conference : 387 (1990), 1 page.

Cha et al., "MEADOW: A Middleware for Efficient Access to Multiple Geographic Databases Through OpenGIS Wrappers", Software Pract. Exper. 32(4): 377-402 (2002), 26 pages.

Cha et al., "Object-Oriented Design of Main-Memory DBMS for Real-Time Applications", RTCSA : 109-115 (1995), 7 pages.

Cha et al., "P*TIME: Highly Scalable OLTP DBMS for Managing Update-Intensive Stream Workload", VLDB: 1033-1044 (2004), 12 pages.

Cha et al., "Paradigm Shift to New DBMS Architectures: Research Issues and Market Needs", ICDE: 1140 (2005), 1 page.

Cha et al., "Xmas: An Extensible Main-Memory Storage System", CIKM: 356-362 (1997), 7 pages.

Colle et al., "Oracle Database Replay," retrieved from http://www.vldb.org/pvldb/2/vldb09-588.pdf, on or before Sep. 2017, 4 pages.

Dasari, "Modify Parameters to Optimize HANA universe," retrieved from https://blogs.sap.com/2014/05/03/modifyparameters-to-optimize-hana-universe/, on Dec. 22, 2020, 2 pages.

DCX.com [online], "Relay Server logging and SAP Passports," retrieved from http://dcx.sap.com/sqla170/en/html/81f2d96b6ce21014a2779d4e67801fc2.html, on Dec. 22, 2020, 1 page.

Farber et al., "SAP HANA Database—Data Management for Modem Business Applications." SIGMOD Record 40(4): 45-51 (2011), 8 pages.

Hwang et al., "Performance Evaluation of Main-Memory R-tree Variants", SSTD: 10-27 (2003), 18 pages.

Kim et al., "Optimizing Multidimensional Index Trees for Main Memory Access", SIGMOD Conference: 139-150 (2001), 12 pages.

Lee et al., "A Performance Anomaly Detection and Analysis Framework for DBMS Development", IEEE Trans. Knowl. Data Eng. 24(8): 1345-1360 (2012), 16 pages.

Lee et al., "Differential Logging: A Commutative and Associative Logging Scheme for Highly Parallel Main Memory Databases", ICDE 173-182 (2001), 10 pages.

Lee et al., "High-Performance Transaction Processing in SAP HANA", IEEE Eng. Bull. Data. 36(2): 28-33 (2013), 6 pages.

Lee et al., "SAP HANA Distributed In-Memory Database System: Transaction, Session, and Metadata Management", ICDE 1165-1173 (2013), 9 pages.

Oracle.com [online], "Database SQL Language Reference. Types of SQL Statements," retrieved from https://docs.oracle.com/cd/B19306_01/server.102/b14200/statements 1001.htm, on or before Dec. 22, 2020, 4 pages.

Oracle.com [online], "Oracle Database 11g: The Top New Features for DBAs and Developers-Database Replay," retrieved from http://www.oracle.com/technetwork/articles/sql/11g-replay-099279.html on Dec. 22, 2020, 22 pages.

Park et al., "Xmas: An Extensible Main-Memory Storage System for High-Performance Applications". SIGMOD Conference : 578-580 (1998), 3 pages.

SAP Cloud Computing, "Have no Fear, Cloud is here Recap from 2 TechEd's and a Preview on Bangalore" retrieved from http://computing1501.rssing.com/chan-8466524/all_p7.html, on Dec. 22, 2020, 59 pages.

SAP.com [online], "Explain Plan," retrieved from https://help.sap.com/viewer/4fe29514fd584807ac9f2a04f6754767/2.0.00/en-US/20d9ec5575191014a251e58ecf90997a.html, on or before Dec. 22, 2020, 5 pages.

SAP.com [online], "Performance Trace Options," retrieved from https://help.sap.com/doc/bed8c14f9f024763b0777aa72b5436f6/2.0.00/en-US/80dcc904a81547a69a7e7105f77e0e91.html, on Dec. 22, 2020, 1 page.

SAP.com [online], "SAP Controls Technology Part 3," retrieved from http://www.itpsap.com/blog/2012/06/23/sap-controls-technology-part-3/, on Dec. 22, 2020, 4 pages.

SAP.com [online], "SQL Statements in SAP HANA," retrieved from http://sapstudent.com/hana/sql-statements-in-sap-hana, on Aug. 16, 2017, 4 pages.

SAP.com [online], "Stop and Start a Database Service," retrieved from https://help.sap.com/doc/6694445c94ae495c83a19646e7c3fd56/2.0.00/en-US/c13db243bb571014bd35a3f2f6718916.html, on Dec. 22, 2020, 2 pages.

Scribd.com [online], "Week 5 Unit 1: Server-Side JavaScript (XSJS)" retrieved from https://www.scribd.com/document/277530934/Week-05-Exposingand-Consmning-Data-With-Server-Side-JavaScript-Presentation, on Dec. 22, 2020, 29 pages.

Sikka et al., "Efficient Transaction Processing in SAP HANA Database: The End of a Column Store Myth", SIGMOD Conference: 731-742 (2012), 11 pages.

SlideShare.net [online], "SAP HANA SPS 09—What's New?," retrieved from https://www.slideshare.net/SAPTechnology/sap-hana-sps-09-smart-data-streaming, Nov. 2014, 48 pages.

Yoo et al., "A Middleware Implementation of Active Rules for ODBMS", DASFAA: 347-354 (1999), 8 pages.

Yoo et al., "Integrity Maintenance in a Heterogeneous Engineering Database Environment", Data Knowl. Eng. 21(3): 347-363 (1997), 17 pages.

* cited by examiner

```
selqnta4:/usr/sap/MG1/HDB81/selqnta4/trace/cpt> tar -zxvf
perfanalyzer_37061960936352543.cpt
MANIFEST
SQL_TYPE_INFO
perfanalyzer_indexserver_selqnta4.38103.37061960936352543.sql.00000.msr.gz
perfanalyzer_indexserver_selqnta4.38103.37061960936352543.resource.00000.msr.gz
perfanalyzer_indexserver_selqnta4.38103.37061960936352543.hsh.00000.apx.gz
perfanalyzer_indexserver_selqnta4.38103.37061960936352543.prm.00000.apx.gz
perfanalyzer_indexserver_selqnta4.38103.37061960936352543.rst.00000.apx.gz
perfanalyzer_indexserver_selqnta4.38103.37061960936352543.pln.00000.apx.gz
perfanalyzer_indexserver_selqnta4.38103.37061960936352543.transaction.00000.apx.gz
perfanalyzer_indexserver_selqnta4.38103.37061960936352543.application.00000.ctx.gz
perfanalyzer_indexserver_selqnta4.38103.37061960936352543.session.0000.ctx.gz
```

*FIG. 5A*

```
selqnta4:/usr/sap/MGA/HDB91/selqnta4/trace/MGA_3891072603060853B> tree
.
|-- 31
|   |-- 313526
|   |   |-- parameters.dat
|   |   |-- requests.dat
|   |   '-- session.ctl
|   '-- 313527
|       |-- parameters.dat
|       |-- requests.dat
|       '-- session.ctl
|-- batch_update_counts.dat
|-- nested_statements.dat
|-- nondeterministic_functions.dat
|-- results.dat
|-- sql_types.dat
```

*FIG. 5B*

```
|-- 30
|-- 303382
     |-- parameters
     |    |-- 1
     |         |-- parameters_1.dat
     |-- requests.dat
     |    |-- 1
     |         |-- requests_1.dat
     |-- result_row_counts
     |    |-- 1
     |         |-- result_row_counts_1.dat
     |-- result_row_counts_from_rst
          |-- 1
               |-- result_row_counts_from_rst_1.dat
```

*FIG. 6B*

PREPROCESSING IN DATABASE SYSTEM WORKLOAD CAPTURE AND REPLAY

CLAIM OF PRIORITY

This application claims the benefit of and priority to U.S. App. No. 63/004,554, filed on Apr. 3, 2020, the disclosure of which is expressly incorporated herein by reference in the entirety.

BACKGROUND

Enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

There is a drive to optimize performance of database systems. Optimization can improve execution time of transactions, as well as reduce the load on technical resources (e.g., processors, memory) during execution of transactions. In some instances, optimization can be achieved by changing operational parameters of the database system, and/or changing versions of software implementing the database system. However, in some cases, such changes can have a negative impact on the performance.

In view of this, prior to changing database system parameters and/or software, it can be useful to evaluate the performance of a target database system that implements the changes to compare its performance with a source database system (e.g., a database system that does not include the changes). In some instances, a simulated or emulated workload is run on the target database system. To achieve this, a capture file records a workload executed within the source database system, and one or more replay files are generated based on the capture file. The workload is replayed within the target database system using the one or more replay files. However, generation of replay files from capture files can be a time-consuming and resource-intensive task, which significantly impacts consumption of memory and processing power. In some instances, the process to generate replay files fails due to an out-of-memory (OOM) condition, when a computing device executing the process has insufficient memory to handle the data.

SUMMARY

Implementations of the present disclosure are directed to capture and replay of workloads in database systems. More particularly, implementations of the present disclosure are directed to preprocessing of capture files to provide replay files for workload capture and replay in database systems.

In some implementations, actions include receiving a capture file, the capture file including data representative of a workload executed in a source database system, and processing the capture file to provide a replay file, the replay file being in a format that is executable by a replayer to replay the workload in a target database system, processing the capture file including: processing the capture file to provide a set of intermediate files, and processing the set of intermediate files using in-memory merge sort operations to generate a set of replay files. Other implementations of this aspect include corresponding systems, apparatus, and computer programs, configured to perform the actions of the methods, encoded on computer storage devices.

These and other implementations can each optionally include one or more of the following features: the set of intermediate files are partially sorted in a session-wise file hierarchy based on session identifiers (IDs) of respective sessions executed during execution of the workload in the source database system; the in-memory merge sort operations include sorting elements of sub-sets of intermediate files a time in main memory and merging elements in max heap memory; processing the capture file to provide the set of intermediate files at least partially includes reading data of service files in-memory and joining at least portions of the data; processing the capture file to provide the set of intermediate files at least partially includes decompressing the capture file and processing the capture file using a set of executor threads to provide a set of service files, the set of intermediate files being generated using the set of service files; each replay file is associated with a respective session executed during execution of the workload in the source database system based on a respective session identifier (ID); and actions further include executing one or more manipulations after merging a sub-set of intermediate files.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5A depicts an example structure of a capture file.

FIG. 5B depicts an example structure of a replay file that is provided by a pre-processor processing the capture file of FIG. 5A.

FIG. 6B depicts an example of partially sorted intermediate file structure in a session-wise file hierarchy.

Like reference symbols in the various drawings indicate like elements.

DETAILED DESCRIPTION

Implementations of the present disclosure are directed to capture and replay of workloads in database systems. More particularly, implementations of the present disclosure are directed to preprocessing of capture files to provide replay files for workload capture and replay in database systems. Implementations can include actions of receiving a capture file, the capture file including data representative of a workload executed in a source database system, and processing the capture file to provide a replay file, the replay file being in a format that is executable by a replayer to replay the workload in a target database system, processing the capture file including: processing the capture file to provide a set of intermediate files, and processing the set of intermediate files using in-memory merge sort operations to generate a set of replay files.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than diskstorage databases. While SAP HANA is used as an example herein, it is contemplated, however, that implementations of the present disclosure can be realized in any appropriate database system.

Figure 1:
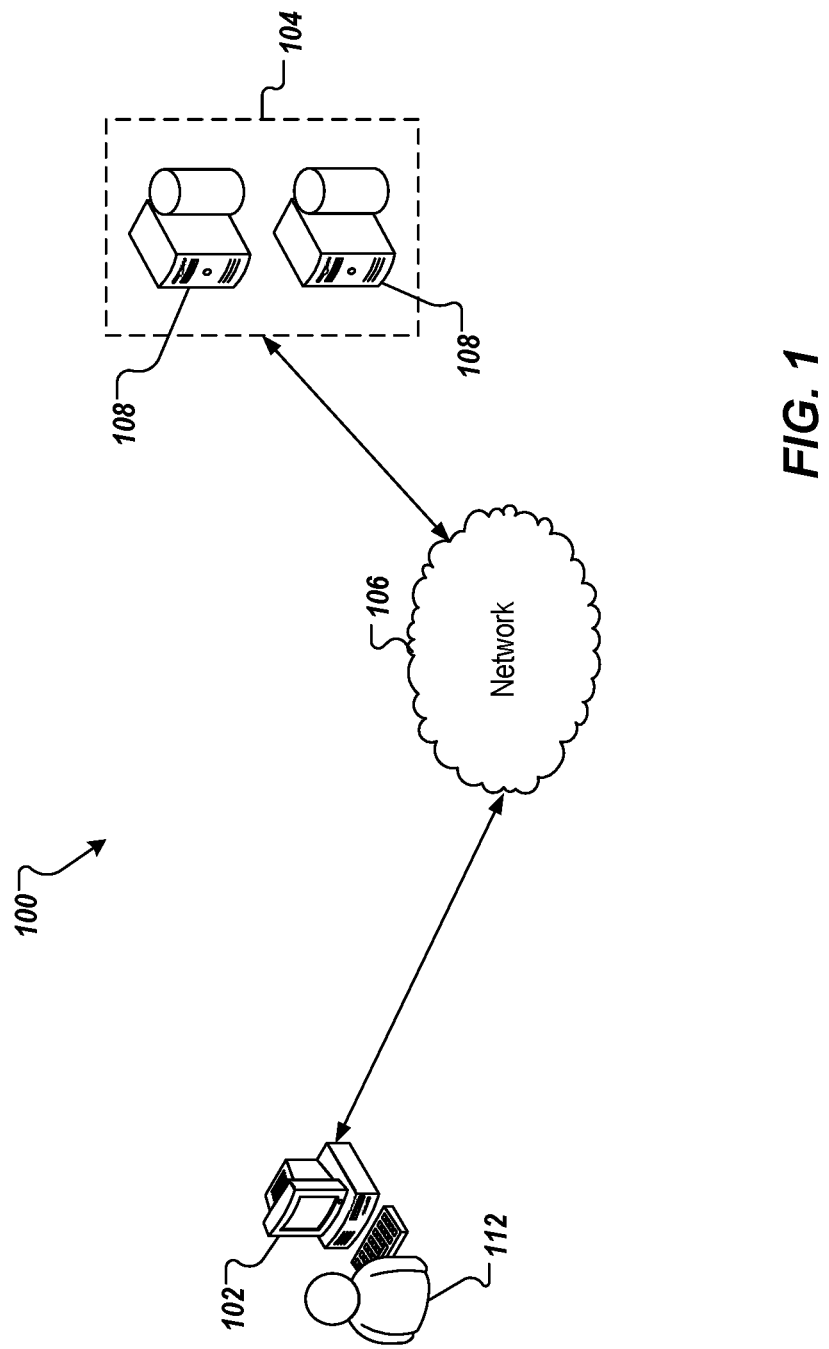
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an in-memory database system (e.g., SAP HANA). In addition, and as described in further detail herein, the server system 104 can host a source database system, a target database system, and a workload capture and replay system that enables a workload of the source database system to be recorded (captured) and replayed in the target database system. The capture and replay system provides pause and resume functionality for request-specific replay to provide granular results in accordance with implementations of the present disclosure. In some examples, a workload includes a set of requests (e.g., $R_1, \ldots R_m$, where m is a number of requests R in the set of requests). In some examples, a workload operates on a database system to induce changes in the database system through query statements (e.g., structured query language (SQL) statements) that come from client interfaces (e.g., Java Database Connectivity (JDBC), Open Database Connectivity (ODBC), database shared library (DBSL)). A workload can be created by applications or clients.

In some examples, a request is a smaller unit than a query statement (e.g., SQL statement). For example, a query statement can include (or result in) a set of requests (one or more requests). Example requests can include, without limitation, Connect, Disconnect, Prepare Statement, ExecuteStatement, Fetch, AbortTransaction, CommitTransaction, Get LOB Piece, Put LOB Piece, and the like.

To provide further context for implementations of the present disclosure, and as introduced above, there is a drive to optimize performance of database systems. Optimization can improve execution time of transactions, as well as reduce the load on technical resources (e.g., processors, memory) during execution of transactions. In some instances, optimization can be achieved by changing operational parameters of the database system, and/or changing versions of software implementing the database system. However, in some cases, such changes can have a negative impact on the performance.

In view of this, prior to changing database system parameters and/or software, it can be useful to evaluate the performance of a target database system (e.g., a test database system) that implements the changes to compare its performance with a source database system (e.g., a production database system) that does not include the changes. In some instances, a simulated or emulated workload is run on the target database system. However, the simulated or emulated workload may not accurately reflect the workload experienced by the source database system. Accordingly, results from the target database system may not accurately reflect the performance of the source database system under the changes.

To address this issue, capture and replay systems have been developed that enables capturing (recording) of production workloads (actual, real-world workloads) at a source database system, replaying a captured workload at a target database system, and comparing the performance of target database system to the performance of the source database system. An example includes the SAP HANA Capture and Replay tool provided by SAP SE. Although the SAP HANA Capture and Replay tool is referenced herein by way of example, it is contemplated that implementations of the present disclosure can be realized with any appropriate capture and replay system.

In general, the capture and replay system is a fully- or semi-automated tool for integrated testing in the context of a database system (e.g., SAP HANA). The capture and replay system reduces effort needed for creating tests and performs a more accurate replay than is possible with other approaches. In some examples, the capture and replay system enables similar concurrency, memory allocation and CPU usage in the target database system as seen in the source database system, from which the captured workload is provided.

Figure 2:
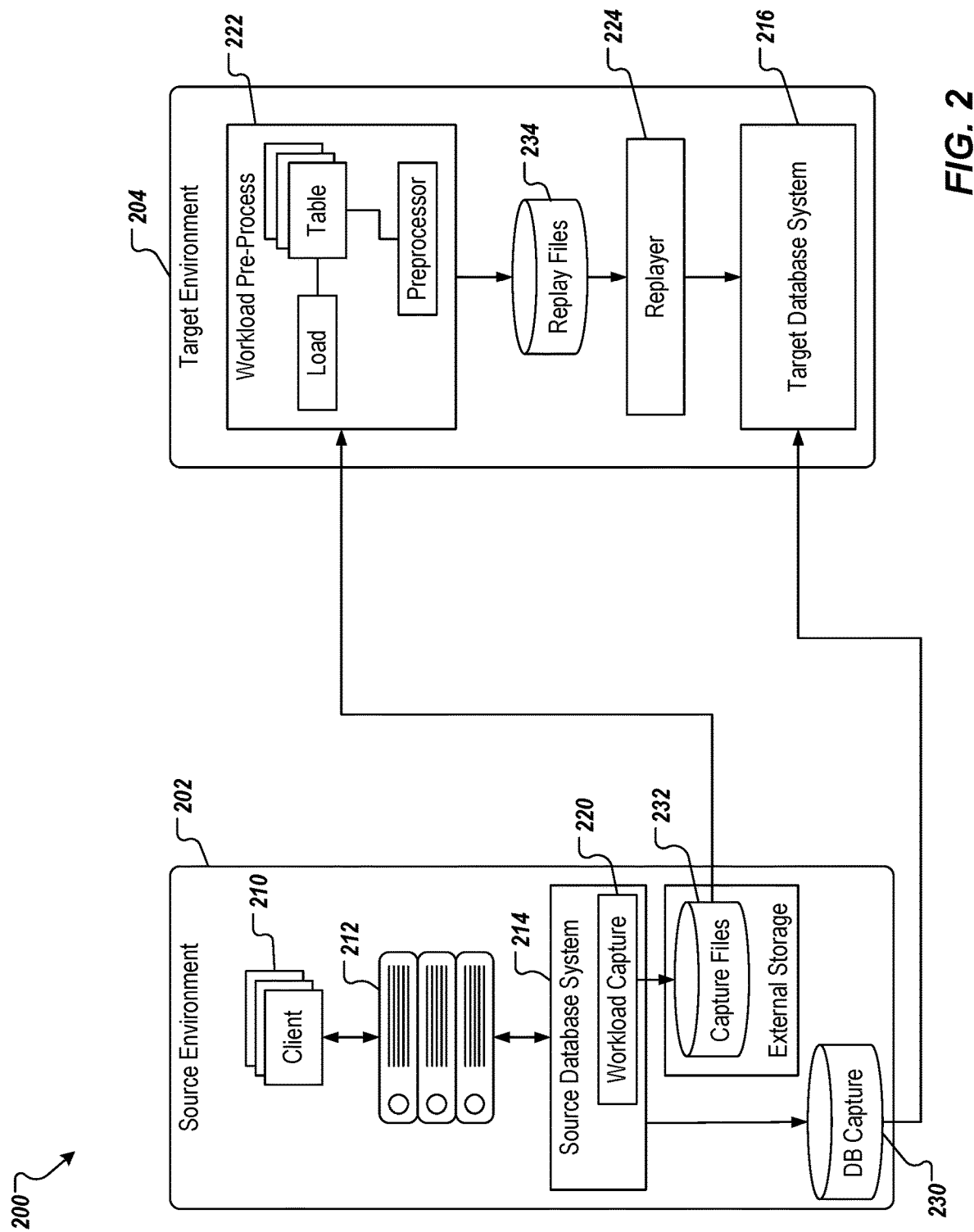
FIG. 2 depicts a conceptual architecture providing capture and replay functionality.

FIG. 2 depicts a conceptual architecture 200 providing capture and replay functionality. In the example of FIG. 2, the conceptual architecture 200 includes a source environment 202 and a target environment 204. The source environment 202 includes one or more clients 210, one or more application servers 212, and a source database system 214. The target environment 204 includes a target database system 216.

In some examples, during production use, the clients 210 interact with the source database system 214 through the application servers 212. For example, a client 210 can instigate a transaction that is to be executed on the source database system 214, which transaction can access, add, modify, and/or delete data within the source database system 214. It can be determined that a configuration and/or software of the target database system 214 are to be changed. Example changes can include changing configuration settings and/or updating the software of the target database system 214 from a first version (V1) to a second version (V2). Prior to implementing the changes in production, the changes are evaluated within the target environment 204.

To evaluate the change, a capture and replay system is used to capture a workload (e.g., one or more transactions) executed within the source environment 202 to replay in the target environment 204. In the example of FIG. 2, the capture and replay system includes a workload capture module 220, a workload pre-processing module 222, and a replay module 224 (also referred to herein as a replayer). In the example of FIG. 2, the workload capture module 220 is executed directly within the source database system 214, and the replay module 224 is executed directly within the target database system 216.

In some examples, prior to executing the workload that is to be captured, at least a portion of the data stored within the source database system 214 is copied to a database capture store 230. For example, data (e.g., stored in one or more tables) that is to be accessed by the workload is stored in the database capture store. In some examples, configuration parameters of the source database system are stored in the database capture store 230. In some examples, the data and configuration parameters recorded in the database capture store 230 provide a snapshot of a state of the source database system 214 immediately prior to execution of the workload. Prior to replay of the workload in the target system 204, the information from the database capture store 230 can be provided to the target system 204. In this manner, the target database system 216 can be initialized to the state of the source database system 214 before manipulation through replay of the workload in the target database system 216. In some examples, after replay of the workload in the target database system 216, the target database system 216 can be re-initialized to the state of the source database system 214 (e.g., to replay the workload again in the target database system 216).

As introduced above, during production use, the one or more clients 210 issue transactions (also referred to herein as requests for database operations) to the one or more application servers 212. The one or more application servers 212 send the requests for database operations to be carried out by the source database system 214. Further, during production use, the source database system 214 can generate information about the requests, which is recorded in one or more capture files stored within a capture file store 232. In some examples, the capture files are generated by the workload capture module 220 and can include information regarding the request (including the request), data, including metadata, generated during execution of the request, the results of the request, and information about the source system 202 (e.g., the clients 210, the application servers 212, and/or the source database system 214).

In some examples, a capture file is provided as a tape archive (TAR) file, which can be described as a file format that is used to store multiple files in a single file (i.e., the capture file). A TAR file includes a manifest file that provides information on the contents of the TAR file. As a TAR file, an example capture file can be provided as:

---
ABC.cpt (TAR file)
---
HEADER
CONTENTS (MANIFEST)
HEADER
CONTENTS (AAA.gzip)
HEADER
CONTENTS (BBB.gzip)
. . .

---

Also as a TAR file, the manifest file can be read without having to be extracted. In some examples, the capture file is compressed (e.g., a compressed TAR file). Still, the manifest file can be read without first uncompressing (or un-TAR'ing) the capture file.

In some examples, a capture file, or a set of capture files, includes data associated with, and organized by, a capture unit. The capture unit can be, for example, a session between a client 210 and the source database system 214, which is mediated by an application server 212. The session can include one or more requests for database operations, such as one or more statements in a query processing language. In some examples, a capture file, or a set of capture files, represents another processing unit, such as a statement, or a set of statements over a time period.

In some examples, the capture files are pre-processed by the workload pre-processing module 222 to provide one or more replay files that are stored in a replay file store 234. Each replay file enables a workload, or a portion of a workload, to be replayed within the target database system 216 (e.g., by the replay module 224). In some examples, the replay files include decompressed information captured in the capture files, or otherwise include data of one or more capture files provided in a form that is more easily executed at the target database system 216. In addition to information used for replaying requests for database operations, the capture files can include information that is used to evaluate the performance of the target database system 216. In some examples, the replay module 224 processes the replay files to send requests for database operations to the target database system 216, the requests emulating the requests issued by the clients 210 to the source database system 214.

Figure 3:
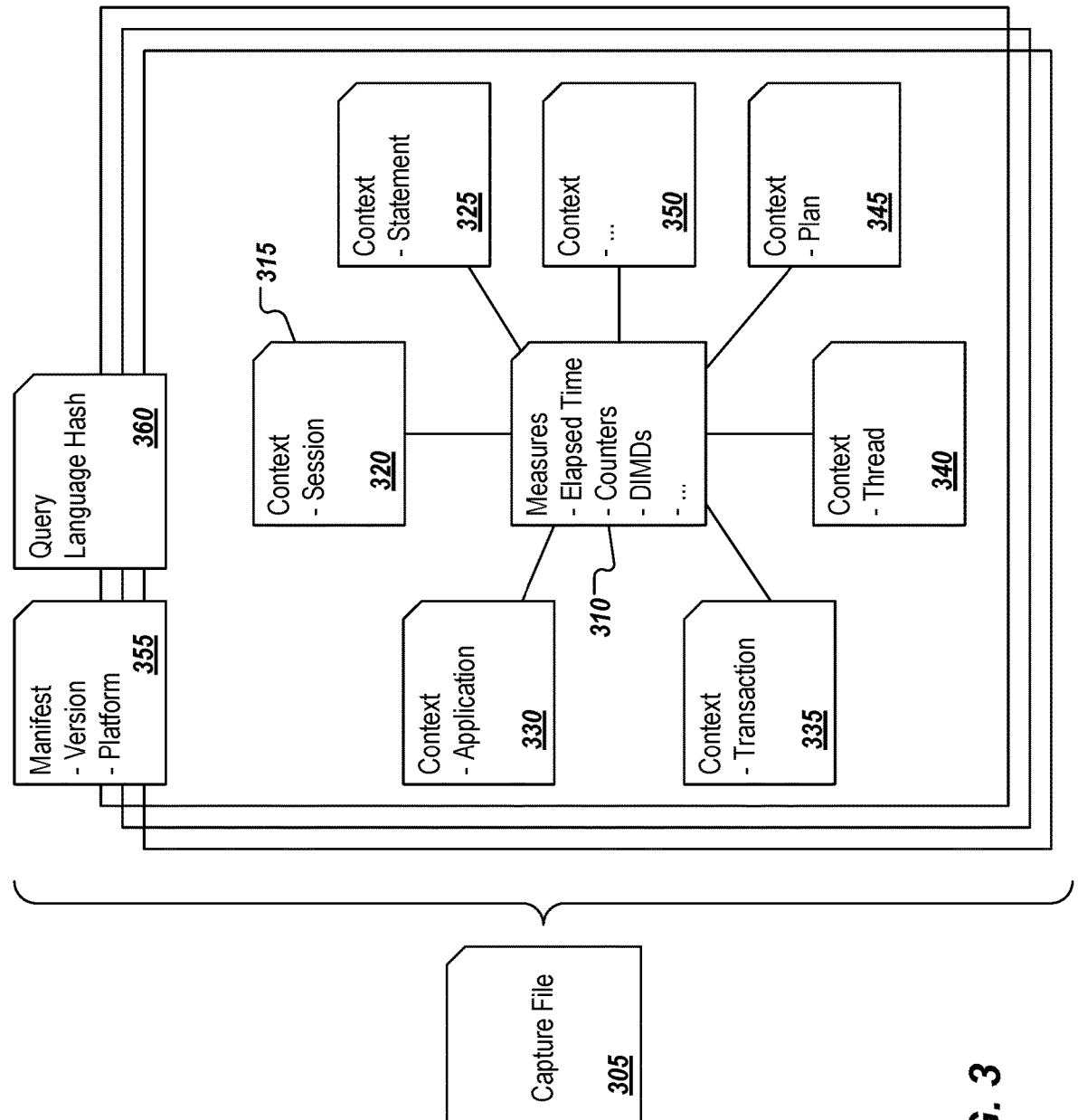
FIG. 3 depicts a workload capture file schema for storing context data and performance data recorded during execution of a workload in a source database system.

FIG. 3 depicts a workload capture file schema 300 for storing context data and performance data recorded during execution of a workload in a source database system (e.g., the source database system 214 of FIG. 2).

In some instances, the volume of information that can be collected for a workload can be large. The volume of information can be reduced by only including a portion of the information, such as a portion of context information, in the capture files. Further, to assist with organization and compression of the information, the information can be organized in a schema or a dimensional model, such as a star schema. For example, measures and facts can be used as a central fact table or tables, which reference as points one or more dimensions, each dimension including one or more contexts. In some examples, each point represents a discrete context, and, in addition to any facts or measures, the fact table includes identifiers for corresponding information in the dimensions.

FIG. 3 depicts a capture file 305 that includes a fact table 310 correlated with a set of dimensions 315. In the example of FIG. 3, the fact table 310 is shown as associated with dimensions 315 representing contexts for a session 320, a statement 325, an application 330, a transaction 335, a thread 340, a plan (such as a query execution plan) 345, and other parameters 350. The fact table 310 includes various measures, such as elapsed time and any counters associated with the capture unit associated with the capture file 305 or collection of capture files (such as a session). The fact table 310 also includes dimension identifiers (DIMIDs) used to correlate entries in the fact table 310 with each of the dimensional contexts 320, 325, 330, 335, 340, 345, 350. Although a single fact table 310 is shown, multiple fact tables 310 can be included in a capture file.

In some examples, the fact table 310 and the dimension tables 315 can include records for a plurality of capture units (e.g., sessions) of the source database system. In some cases, the fact table 310 and each of the dimension tables 315 can be stored as separate files. In some examples, the capture file 305 can be compressed using any appropriate compression algorithm. In examples, where a database system from which a workload is captured includes more than one server or node, the capture file 305 can record data representative of activity occurring at a single node of the source database system.

In some examples, the capture file 305 can include additional information. In the example of FIG. 3, the capture file 305 includes manifest information 355. Manifest information 355 can include, for example, information related to the source database system, such as a identifier for the program version used to implement the source database system and information relating to the computing system used to implement the source database system (e.g., the number and type of processors, amount and organization of memory and physical storage, information related to networked devices implementing the source database system, or configuration information for the source database system or its components). The manifest information 355 can also include a timestamp associated with the capture file 305 (e.g., a time the capture file was generated, a time the workload capture was initiated, a time workload capture was discontinued). If filters were used to select workload elements to capture, the filter information can also be included in the manifest information 355. When used to store information related to multiple database nodes, the fact table 310 and/or the dimension tables 315 can include information regarding which of the multiple database nodes was involved in executing operations of the workload capture unit, or a subcomponent thereof (such as in executing a statement associated with a particular session). In some examples, the manifest information 355 can be stored in a file, such as a compressed file, and included within the capture file 305.

In some examples, the capture file 305 can also include hash information 360. For example, query language statements in the fact table 310 or the dimension tables 315 can be represented by a hash value. The hash information 360 can include a hash table correlating hash values to query language statements. By only storing the hash value of the query language statement in the measure file 310 or one or more of the context files 315, the amount of memory needed to store the workload capture can be reduced. In some examples, hash values can be used to confirm that execution of requests for database operations at the target database system produced the same results as when originally executed at the source database system. In some examples, the granularity of hashing can be specified, such as by a user, in such cases, the hash level can be included in the capture file 305, such as in the manifest information 355.

In some examples, the fact table 310 and the dimension or context tables 315 can be stored as files, and the fact or dimension files grouped together in the context file 305, optionally including a file for the manifest information 355 or a file for the hash information 360. In some examples, each of the context tables 315 is stored as a separate file within the capture file 305. Each of the capture files 305 can include a DIMID field, and one or more value fields. In a specific example, the values can be written in comma separated value format (.csv). Similarly, each measure can be stored as a separate file within the capture file 305. Each of the measure files can include a chronological identifier, such as a clock timestamp (such as for the overall database system from which the workload was captured). The chronological identifier can be used, for example, in staging replay of the capture units (such as sessions) represented in the capture file 305. The measure file can also include multiple DIMID fields to associate measures for a particular workload capture unit with its associated dimensions, and one or more numerical fields (such as performance or execution parameters or values). In particular examples, the DIMID or numerical fields can be written in comma separated value format.

In some examples, context files and one or more measure files can be stored for each of a plurality of services in a database system. The set of context files and one or more measure files for each of the services can be included in the capture file 305 (which, in at least some examples, represents a single database server or node, such as when the database system is distributed among multiple servers or nodes). For example, a database system can have separate services that include query language processing components and data stores, that produce information regarding the distribution of information (including database records) and database system components in the database system, that are responsible for handling certain types of client communications, such as web or hypertext transfer protocol (HTTP)-based interactions, that manage various memory stores (such as transferring data between persistent storage and in-memory storage), and that monitor resource (such as CPU or memory) use in the database system (including across multiple database servers, when the database system is a distributed system).

As introduced above, for a workload to be replayed in a target database system, one or more capture files, representative of the workload, are pre-processed to provide one or more replay files. A replayer processes the replay files to replay the workload in the target database system. As described herein, the pre-processor processes the capture files to provide the replay files. More particularly, the pre-processor converts the capture file from the fact table and dimension tables schema (as described above with reference to FIG. 3) using joining requests from the fact table and dimension tables and globally sorting by operation sequence IDs within a session, where a dependency graph is aligned by the operation sequence ID.

Figure 4:
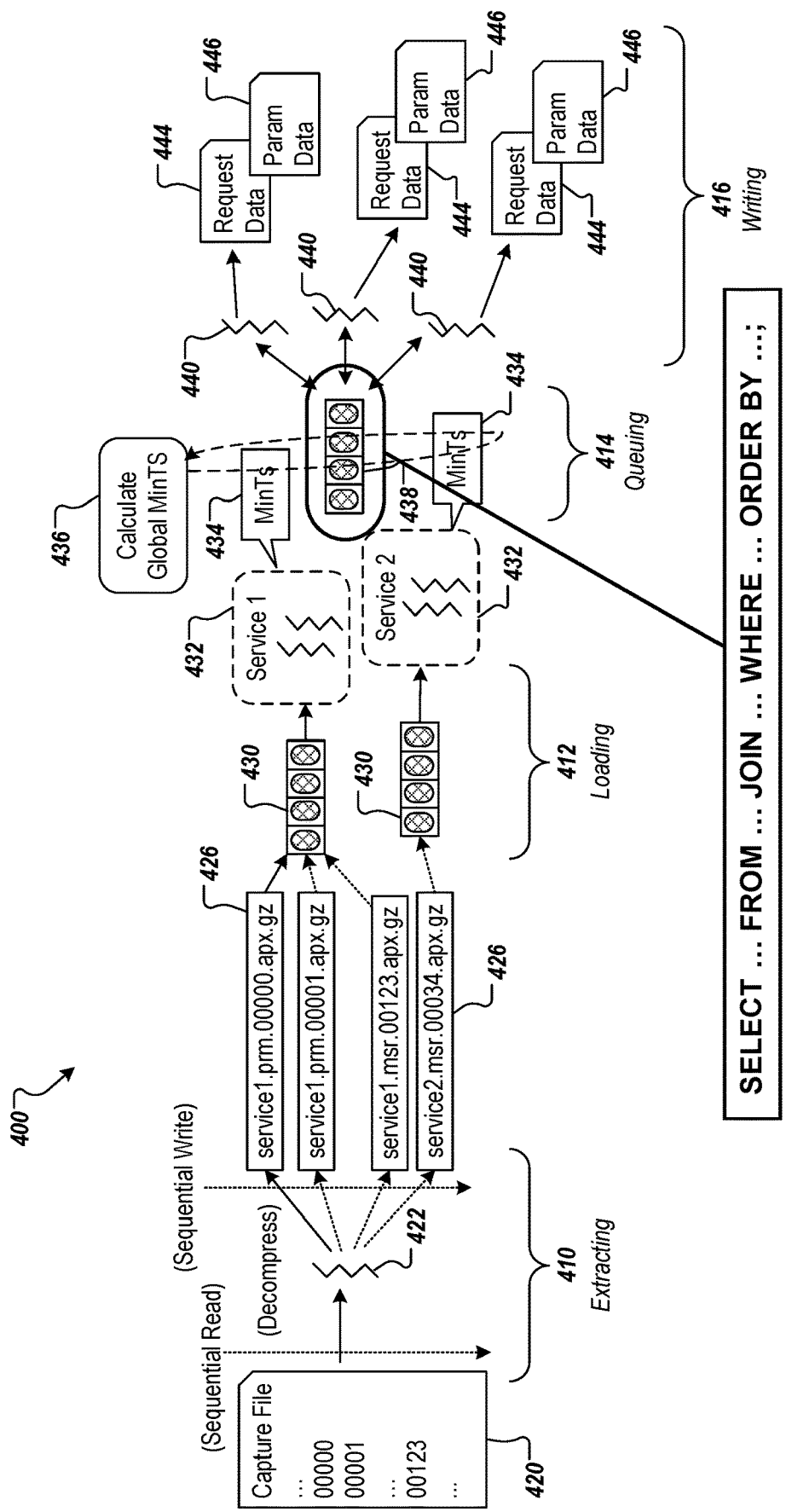
FIG. 4 depicts a process for converting a workload capture file into a replay file for execution in a target database system.

FIG. 4 graphically depicts a process 400 for pre-processing to convert a workload capture file into a replay file for execution in a target database system. The process 400 includes an extraction sub-process 410, a loading sub-process 412, a queuing sub-process 414, and a writing sub-process 416.

In the extraction sub-process 410, a capture file 420 is read by one or more executor threads 422. In some examples, the executor thread(s) 422 read the capture file 420 sequentially. The executor thread(s) 422 can decompress a portion of the capture file 420 into files for various database services (e.g., a service providing query language processing, a service providing location information for data and database system components). The executor thread(s) 422 can write the content of the capture file 420 as one or more files 426, such as compressed files, associated with a service. Each service can include a plurality of files 426. For example, a particular service may be associated with one or more context files (dimension files) and one or more measure files (fact files).

In some examples, the files 426 can be placed in a queue 430 in the loading sub-process 412. In the loading sub-process 412, each service may be associated with a loader thread group 432. Each loader thread group 432 can read appropriate files 426 from the queue 430 to determine which elements of the files 426 are associated with a particular capture unit (e.g., a session). In some examples, elements of files 426 from different loading processes (such as from different services) can be combined based on their capture unit. In some examples, the capture unit can be represented in an encoded format (e.g., as a hash value). In some examples, a particular request for database operations can include nested statements or operations. These statements or operations can, in some examples, be executed in parallel at multiple nodes of the database system. In such examples, the statements may be included in multiple workload capture files 420, but can be combined during processing of the capture file(s) 420 during conversion to replay data.

In some examples, as the files are loaded by the loader thread groups 432, context and measure information related to individual captures units (and their component operations) can be retrieved or collected by the loader thread groups 432 and added to a queue 438 in the queuing sub-process 414. In some examples, the queue 438 holds the information until the information is ready to be written to individual stores, such as files, for the session. For example, multiple stores may be generated for context information, organized in a format useable by a replay component (e.g., the replayer 224 of FIG. 2) to replay the workload at a second database system (e.g., the target database system 216).

In some examples, the queue 438 can be a table partitioned by session. Information in the queue 438 can be structured in a similar manner as context and measure information was associated with the session at the capture database system (e.g., the source database system 214 of FIG. 2). For example, the queue 438 can use the star schema of FIG. 3.

In some examples, the loader thread groups 432 can maintain information about the minimum timestamp (e.g., a system timestamp, commit timestamp, or other identifier) of information to be read by the loader thread groups 432 for their particular service. The loader thread groups 432 can update a global timestamp 436, which represents the minimum timestamp among all of the services being processed by the loader thread groups 432. The global timestamp 436 can be compared with a timestamp for the session (or other capture unit). When the global timestamp 436 is greater than or equal to the timestamp for a session, the session can be written to a store.

In some examples, as a session (or other capture unit) is completed, and writer threads 440 of the writing sub-process 416 are available, each session can be written (such as to a file or in memory) as request data 444 and parameter data 446. In some examples, the request data 444 and the parameter data 446 can be provided in one or more replay files. In some examples, the request data 444 can include context and measure information used to replay the session (including requests for database operations within the session). In some examples, the request data 444 can include performance data usable to compare execution of the requests with the execution of the requests at the workload capture database system. In some examples, the parameter data 446 can include parameters used in executing the requests, such as a statement string and parameter values used in executing query language operations.

In some examples, the writer threads 440 can combine context and measure data from the queue 438 as appropriate for the sessions, and requests for database operations thereof. Within a session, requests for database operations, and components thereof (such as statements, and operations associated with statements), can be ordered by the writer threads 440 during the writing process 416, such as chronologically (such as by using timestamps, for example, a system timestamp, a commit timestamp, or another identifier). In this manner, the requests will reproduce the workload of the first database system (e.g., the source database system 214 where the requests were captured) when the requests are carried out by a second database system (e.g., the target database system 216). For example, statements (or operations thereof) can be ordered within a session by a system clock timestamp or a global commit timestamp.

In some examples, when a session is written to a replay file (e.g., one or more replay files including the request data 444 and the parameter data 446), the data can be removed from the queue 438, which can limit the amount of memory or storage needed for the queue. In some examples, the queue 438 can be persisted, such as for use in comparing the performance of the database system where the workload is replayed to the performance of the workload capture database system.

In some examples, the request data 444 can include information to be replayed, the parameter data 446 can include performance measures associated with execution of the session (or other unit) at the first database system, to be compared with performance measures generated during execution of the workload at the second database system. In some examples, the request data 444 and the parameter data 446 can be replayed and used for comparison purposes multiple times. For example, the request data 444 can be replayed at the second database system using different performance or operational settings. The performance at the various settings of the second database system can be compared with one another, and with the parameter data 446.

FIG. 5A depicts an example structure of a capture file. FIG. 5B depicts an example structure of a replay file that is provided by a pre-processor processing the capture file of FIG. 5A.

Capture and replay systems, such as that described herein with reference to FIGS. 2-4, are described in further detail in commonly assigned U.S. Pat. No. 10,552,413, which is expressly incorporated herein by reference in the entirety for all purposes.

As introduced above, capture and replay systems can be used for problem detection and reproduction in database systems. For example, capture and replay can be used to replay a workload of a source database system to help resolve one or more issues (e.g., an issue in the source database system, an issue in a target database system). However, to replay a workload in a target database system, capture files are preprocessed to provide replay files (e.g., as described above with reference to FIG. 4). The preprocessing of the capture files can be time-consuming and inefficient in terms of technical resources (e.g., processing power, memory) expended to perform the preprocessing. In some instances, if the capture file is too large, preprocessing can fail due to lack of memory. Further, previous approaches are absent global sorting of replay files, which can result in errors occurring during replay. In some traditional approaches, the capture files are provided in a network file system (NFS) and unstable networks could result in crashing of the database system. Traditional approaches also are absent controlling of numbers of threads used to process capture files and difficulties in identifying causes of errors when preprocessing fails.

Accordingly, implementations of the present disclosure provide improved preprocessing of capture files to provide replay files for workload capture and replay in database systems. More particularly, and as described herein, implementations of the present disclosure provide more efficient preprocessing of capture files than achieved in some approaches (e.g., the preprocessing described above with reference to FIG. 4). That is, the preprocessing of the present disclosure is faster and more efficient in terms of technical resources (e.g., computing power, memory) expended to perform the preprocessing. Further, implementations of the present disclosure As described in further detail herein, implementations of the present disclosure include processing of capture files (e.g., storing fact tables and dimension tables) to join dimension data into respective requests, which are globally sorted on a file system as replay files. The joined and sorted replay files are grouped by session identifier (ID). Further, implementations of the present disclosure execute in-memory merge sort for sorting intermediate files that the replay files originate from. In-memory merge sort can be described as a sorting algorithm that can handle relatively large amounts of data, the data (e.g., intermediate files) being loaded in-memory of a database system (e.g., SAP HANA) for processing.

Implementations of the present disclosure further include a capture file reader framework, also referred to herein as reader framework, that enables resource-efficient ingestion and processing of capture files. In some implementations, the reader framework enables application of user-defined analytics on the workloads recorded in capture files. In some implementations, the reader framework enables users to define in what order and how workloads are read/joined and processed, as described herein. An example use case can include a table group advisor requesting a statement list analysis. An example statement list analysis can include, without limitation, a list of statements/queries and respective statistics (e.g., total execution time/count, related tables, internal timestamps). Another example use case can include reading specific types of workloads. For example, reading dimensions in parallel and loading these into database tables (e.g., as used in the replay portion of capture and replay, described herein.

Figure 6A:
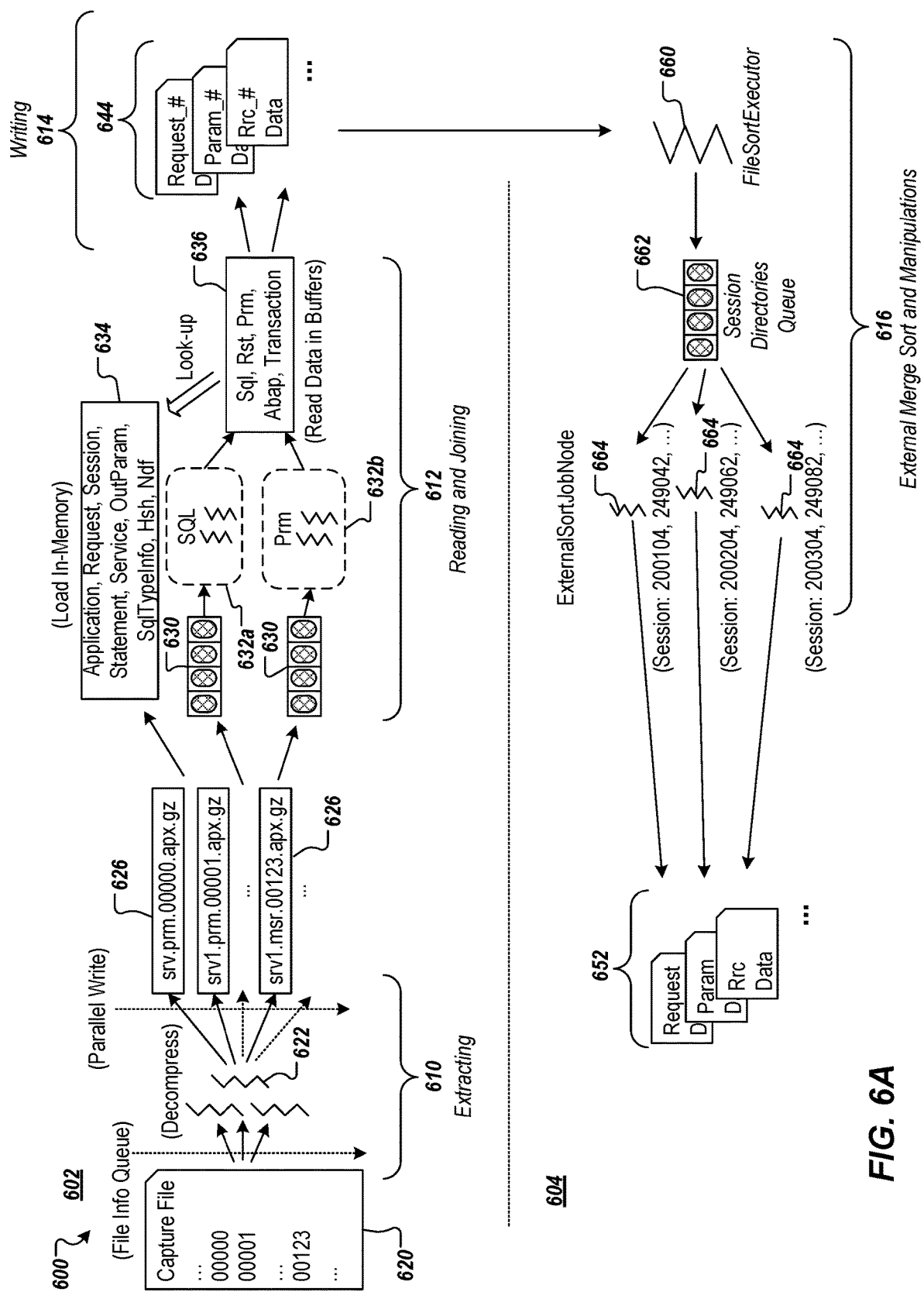
FIG. 6A depicts a process for efficiently converting a workload capture file into a replay file for execution in a target database system in accordance with implementations of the present disclosure.

FIG. 6A depicts a process 600 for efficiently converting a workload capture file into a replay file for execution in a target database system in accordance with implementations of the present disclosure. More particularly, FIG. 6A graphically depicts preprocessing in accordance with implementations of the present disclosure, which includes processing capture files through a reader framework, joining dimension data into a single request that is globally sorted on the file system. The input to the preprocessing includes capture files that record fact tables and dimension tables, and the preprocessing provides output of replay files that are joined and sorted, and that are grouped by session ID.

The example process 600 of the present disclosure includes a first pass 602 and a second pass 604. As described herein, the first pass 602 includes an extraction sub-process 610, a reading and joining sub-process 612, and a writing sub-process 614, and the second pass 604 includes an in-memory merge sort and manipulations sub-process 616. As described herein, the first pass 602 processes a capture file 620 to provide intermediate files 644, and the second pass 604 processes the intermediate files 644 to provide replay files 652. In some implementations, the first pass 602 includes reading the capture file 620 (e.g., using the reader framework of the present disclosure) and joining data in parallel to provide the intermediate files 644 as partially sorted intermediate files. Additional jobs can be inserted while reading the data. The second pass 604 includes reading the intermediate files 644 and sorting by using a merge sort (e.g., an in-memory merge sort process). Additional jobs (e.g., joining result files, manipulating outputs) can be executed while sorting is performed.

Referring again to FIG. 6, the capture file 620 is read by one or more executor threads 622 in the extraction sub-process 610. As described herein, the capture file 620 includes a fact table (e.g., SQL measures) and a set of dimension tables (e.g., application context). In some examples, the executor thread(s) 622 read the capture file 620 in parallel and decompress the capture file 620 into files for various database services (e.g., a service providing query language processing, a service providing parameter information, a service for providing request information, etc.). The executor thread(s) 622 can write the content of the capture file 620 as one or more files 626, such as compressed files, associated with a service. Each service can include a plurality of files 626. For example, a particular service may be associated with one or more context files (dimension files) and one or more measure files (fact files). In accordance with implementations of the present disclosure, the executor thread(s) 622 write the one or more files 626 in parallel. In some examples, the files 626 can be placed in a queue 630 in the reading and joining sub-process 612.

In accordance with implementations of the present disclosure, the dimensions provided from the capture file 620 are read (loaded) in-memory 634 within the target environment. In some examples, the data include various types of data. Example types of data include application data, request data, session data, statement data (e.g., SQL statements), parameter data, and the like. The data has been generated across multiple sessions during execution of the workload in the source database system. In general, the reading and joining sub-process 612 can be described as an in-memory join and sort process, in which metadata information is stored in-memory and, while reading the information, join and sort of the data is performed. After the data is processed by the respective services 632a, 632b the data is read into buffers 636 for subsequent writing to the intermediate files 644.

In the reading and joining sub-process 612, each service may be associated with a loader thread group 632a, 632b, also referred to herein a. Although two loader thread groups are depicted in FIG. 6A, it is contemplated that additional loader thread groups can be provided. Each loader thread group 632a, 632b can read appropriate files 626 from the queues 630 to determine which elements of the files 626 are associated with a particular capture unit (e.g., a session). That is, each loader thread group 632a, 632b is specific to a type of data (e.g., SQL statements, parameters (Prm)). In some examples, elements of files 626 from different loading processes (such as from different services) can be combined based on their capture unit. In some examples, the capture unit can be represented in an encoded format (e.g., as a hash value). In some examples, a particular request for database operations can include nested statements or operations. These statements or operations can, in some examples, be executed in parallel at multiple nodes of the database system. In such examples, the statements may be included in multiple workload capture files 620, but can be combined during processing of the capture file(s) 620 during conversion to replay data.

FIG. 6B depicts an example of partially sorted intermediate file structure 680 in a session-wise file hierarchy. For example, the partially sorted intermediate file structure 680 is an example of intermediate files (e.g., intermediate files 644 of FIG. 6A) for a session having the session ID 303382 assigned thereto.

In some implementations, the first pass 602 is at least partially executed using the reader framework of the present disclosure. In some examples, in processing a capture file, the reader framework includes phases of checking a manifest file, setting parameters and creating and executing job nodes, un-compressing the capture file, and executing capture readers to read data from the files. As described herein, the intermediate files 644 are provided, which are processed through the second pass 604 to provide the replay files 652 as globally-sorted.

In further detail, in the checking the manifest file phase, the reader framework reads the manifest file of the capture file (e.g., compressed TAR file) and information is extracted. For example, and without limitation:

| | |
|---|---|
| fileType1 : | columnName1 : <columnIndex, columnTypeName> |
| | columnName2 : <columnIndex, columnTypeName> |
| | columnName3 : <columnIndex, columnTypeName> |
| fileType2 : | columnName4 : <columnIndex, columnTypeName> |
| | columnName5 : <columnIndex, columnTypeName> |
| statement : | DIMID : <0, BIGINT> |
| | STATEMENT_HASH : <2, VARCHAR(32)> |
| | SATEMENT_ID : <1, BIGINT> |

In the un-compressing phase, the reader framework un-compresses the capture file by un-archiving (e.g., un-TAR'ing) and un-compressing each of the archived files in parallel (e.g., reading the headers, and gathering file numbers, file pointer locations, and the like). In some examples, the reader framework executes multiple threads, each thread reading and un-compressing file contents and write to a file. This is depicted in the extracting phase 610 of FIG. 6, resulting in the files 626.

In the executing capture readers phase, data from the files 626 is read using a set of capture readers. In some examples, the loader thread groups 632a, 632b are respective capture readers described herein. In some examples, each capture reader is specific to a file type and can include one or more threads for reading the respective files. In some implementations, an order is provided for reading the files. An example order can include a first list and a second list, in which the first list is read then the second list is read. An example first list (also referred to herein as a reader order list) includes, without limitation, Application, Request, Session, Statement, Service, OutParam, SqlTypeInfo, Hsh, Ndf, and an example second list includes, without limitation, Sql, Rst, Prm, Abap, Transaction. This example order can be provided as a default order that is executed, unless a customized order is provided, as discussed in further detail below.

In some implementations, and as introduced above, a user-defined customized order can be provided, which processes the files based on the customized order. In some examples, the customized order is programmatically defined within the flow manager. For example, the following pseudo-code can be included in the flow manager:

```
FlowManager::start(FlowManagerBuilder(captureId)
  ...
  .setReaderOrderList(
    {
      {CaptureFileType::Request,
       CaptureFileType::Statement,
       CaptureFileType::Hsh,CaptureFileType::Obj},
      {CaptureFileType::Sql},
      {CaptureFileType::Transaction}
    })
```

-continued

```
.setCustomizedReaderList(
    {
        {CaptureFileType::Sql, [ ](CaptureReaderBuilder&
            b, CaptureFileType type){return
            b.createReader<CustomizedSqlReader>(type);}},
        {CaptureFileType:transaction,
        [ ](CaptureReaderBuilder& b,
            CaptureFileType type){return
            b.createReader<CustomizedTransactionReader>
            (type);}}
    })
...
```

In this example, the setReaderOrderList defines a reader order list (first list) that the capture file types Request, Statement, Hsh, and Obj are first processed (e.g., read, parsed) in parallel, then the capture file type Sql is processed, and then the capture files of type Transaction are read. In some examples, file types not included in the reader order list are not read from the capture files. Also in the above example, the setCustomizedReader List provides user-defined behavior of capture readers for one or more file types identified in the setReaderOrderList, here the file type Sql and the file type transaction. In some examples, for file types not included in the setCustomized ReaderList, default capture reading are executed. In some examples, customization (user-defined behavior) can include whether a single thread or multiple threads is/are to be sued in processing the respective file type.

In some implementations, and with respect to the first list, data of the files are loaded in-memory (e.g., loaded in-memory of a database system, such as SAP HANA). In some examples, capture readers process files of respective file types to selectively return records. For example, a capture reader can execute hasKey (CaptureFileType fileType, dimId), which returns true, if a dimId record exists for filetype. In response, the capture reader can execute getvalueMap (CaptureFileType fileType, dimId) to return the record. For example, an example file can include xxx.obj.0.apx, which records 131081;SYS;RS_TABLES; TABLE;0;0. In this example, hasKey(ObjType, 131081) returns true, and getValueMap(ObjType, 131081) returns SYS;RS_TABLES_;TABLE;0;0.

To briefly summarize the above discussion, the first pass 602 includes extracting data from the capture file 620 in the extraction sub-process 610, load the dimension data in-memory and executing join/sort on the dimension data in-memory in the a reading and joining sub-process 612, and flushing out partially sorted files as the intermediate files 644 in the writing sub-process 614.

In the second pass 604, the intermediate files 644 are provided to a file-sort executor thread 660, which sorts the intermediate files 644 in the in-memory merge sort and manipulations sub-process 616. The sorted intermediate files are provided as input to a session directories queue 662 and are then processed by one or more sort executor threads 664.

The output of the sort executor threads 664 is provided as the replay files 652. In some examples, the replay files 652 are provided in a format that is achieved by joining of requests from the fact table and the dimension tables of the capture file 620 through the first pass 602, and global sorting by operation sequence IDs within each session and aligning the TC dependency graph by the operation sequence IDs through the second pass 604. The replay files 652 can be described as joined and sorted files that are grouped by session ID.

Figure 7:
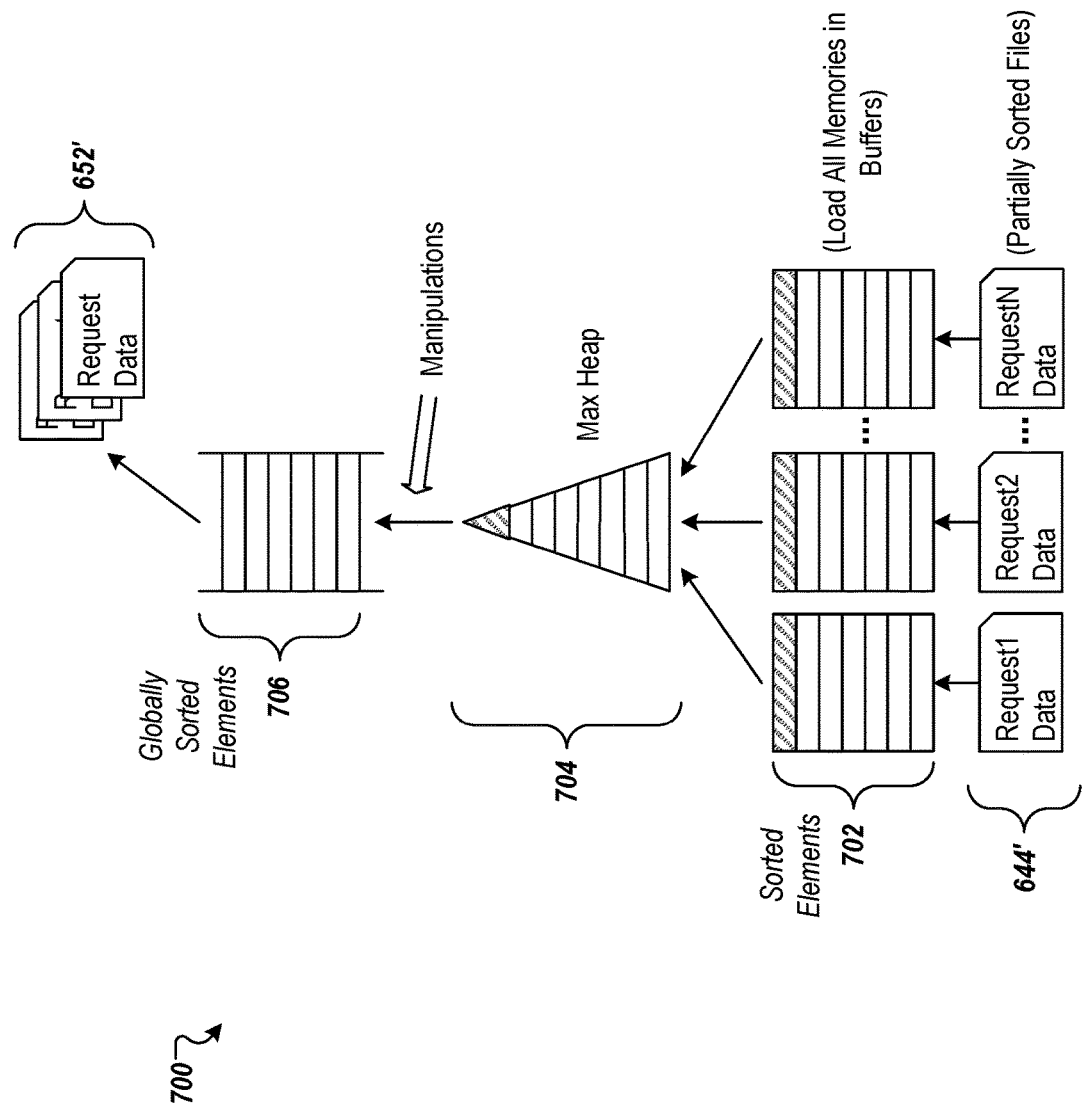
FIG. 7 depicts detail of a portion of the process for efficiently converting a workload capture file into a replay file of FIG. 6A.

FIG. 7 depicts detail of a portion 700 of the process 600 for efficiently converting the capture file 644 into the replay file 652 of FIG. 6A. More particularly, the portion 700 is a representation of at least part of the in-memory merge sort and manipulations sub-process 616. In the example of FIG. 7, a sub-set of intermediate files 644' is processed to provide a sub-set of replay files 652'. In the depicted example, the sub-set of intermediate files 644' includes request files provided in the intermediate files 644 from the capture file 620, and the sub-set of replay files 652' includes respective request replay files provided from the in-memory merge sort, as described herein.

In FIG. 7, the example portion 700 includes sets of sorted elements 702, a merge 704 of the set of sorted elements, and a set of globally sorted elements 706. In some examples, and as described herein, the sub-set of intermediate files 644' is processed by the in-memory merge sort to sort the intermediate files of the sub-set of intermediate files 644' into the respective sets of sorted elements 702. In some examples, and as described herein, the merge 704 merges the sets of sorted elements 702 to provide the set of globally sorted elements 706.

In general, during the in-memory merge sort (e.g., conceptually depicted as the example portion 700 of FIG. 7), session directories and collect request, parameter, result, table parameter directories (e.g., RequestInfo, ParameterInfo, TableParameterInfo, ResultRowCountInfo) are collected and are put into a vector that is specific to a respective session (e.g., vector$_{session\ \#1}$ [session #1/requests, session #1/parameters, session #1/result_row_counts, session #1/tableParameters?, session #2/requests, . . . ]). An atomic index is incremented by the next thread in the thread pool, where each thread handles a sessionDirectory/filetype directory. In some examples, each thread reads all of the partially sorted files into individual memory (queue) up to an entry count (e.g., load_buffer_entry_size_per_partial_sort_file (default 5000). When the memory is empty, the corresponding file is again loaded in-memory. In some examples, a heap memory is provided (e.g., for execution of the merge 704 of FIG. 7), and is provided as the size of all of the files. The two sort columns are copied for an entry of each loaded memory of files and heap sort is executed. The files in the heap memory are flushed as a file when the sorted memory reaches a configured value (e.g., write_buffer_size_for_global_sort (default 1 MB)).

In some implementations, one or more manipulations can be executed to data stored in the files that are flushed from the heap memory into the set of globally sorted elements 706 (buffer). an example manipulation can include, but is not limited to, revising values of data. For example, during a manipulation, values of the data can be read to determine whether the values correspond to expected values and/or expected format. That is, for example, values of the data can be evaluated to identify instances of erroneous data. In some examples, if erroneous data is identified, a manipulation can include changing a value and/or format of the data to be non-erroneous.

Figure 8:
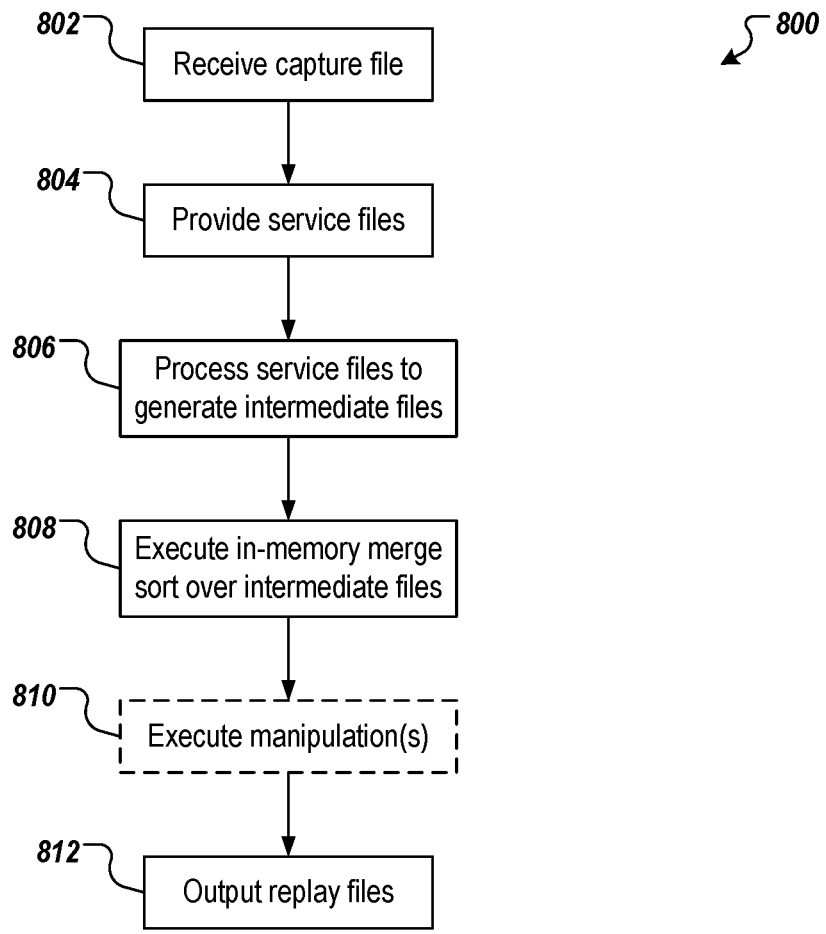
FIG. 8 depicts an example process that can be executed in accordance with implementations of the present disclosure.

FIG. 8 depicts an example process 800 that can be executed in accordance with implementations of the present disclosure. The example process 800 can be executed by one or more computer-executable programs executed using one or more computing devices. In FIG. 8, boundaries having dashed lines depict optional activities.

A capture file is received (802). For example, and as described herein with reference to FIG. 2, a capture file can be generated by the source environment 202 and can be transmitted to the target environment 204. With reference to FIG. 6A, the capture file 620 is received for processing in the first pass 602. A set of service files is provided (804). For example, and as described herein, the executor thread(s) 622 read the capture file 620 in parallel and decompress the capture file 620 into files for various database services (e.g., a service providing query language processing, a service providing parameter information, a service for providing request information, etc.). The executor thread(s) 622 can write the content of the capture file 620 as one or more files 626 (also referred to herein as service files), each file associated with a service.

The set of service files is processed to generate intermediate files (806). For example, and as described herein, the reading and joining sub-process 612 of FIG. 6A executes an in-memory join and sort process, in which metadata information is stored in-memory and, while reading the information, join and sort of the data is performed. This enables writing of the intermediate files 644 as partially sorted in a session-wise file hierarchy based on session identifiers (IDs) of respective sessions executed during execution of the workload in the source database system.

An in-memory merge sort is executed over the intermediate files (808). For example, and as described herein, the in-memory merge sort of FIG. 6A leverages external memory to execute a k-way merge by sorting chunks of data, each chunk fitting in RAM, and merging the sorted chunks together. In some examples, one or more manipulations are performed (810). A set of replay files is output (812). For example, and as described herein, the replay files are globally sorted based on session ID. That is, each replay file is associated with a respective sessions executed during execution of the workload in the source database system based on a respective session ID.

Implementations of the present disclosure achieve one or more technical advantages. For example, implementations of the present disclosure have been tested using a test machine and a set of capture files, the test results indicating significant technical improvements in generating replay files from capture files. The test machine included a logical core 144, Intel® Xeon® CPU E7-8890 v3 @ 2.50 GHz with 1 TB of memory. A first capture file included a file size of 27 GB (compressed) and 84 GB (uncompressed) recording an example workload generated using a HANA/S4 ER3 scenario. The example workload of the first capture file included 12,635 sessions, 91,165,116 statements, and 2,879,745 transactions. A second capture file included a file size of 129 GB (compressed) and 544 GB (uncompressed) recording an example workload generated using the HANA/S4 ER3 scenario. The example workload of the second capture file included 49,979 sessions, 397,002,644 statements, and 6,522,754 transactions. A third capture file included a file size of 201 GB (compressed) and 700 GB (uncompressed) recording an example workload generated using the HANA/S4 ER3 scenario. The example workload of the third capture file included 61,566 sessions, 1,013,784,111 statements, and 16,516,976 transactions. The tables below summarize results of implementations of the present disclosure as compared with a traditional approach:

TABLE 1

Example Results based on First Capture File

|  | Duration | Memory Peak | CPU Peak |
| --- | --- | --- | --- |
| Traditional Process | 1 hour (H) | 293 GB | 76% |
| New Process | 39 minutes (M) | 120 GB | 29% |

TABLE 2

Example Results based on Second Capture File

|  | Duration | Memory Peak | CPU Peak |
| --- | --- | --- | --- |
| Traditional Process | 2 H 46 M | 600 GB | 76% |
| New Process | 2 H 20 M | 175 GB | 30% |

TABLE 3

Example Results based on Third Capture File

|  | Duration | Memory Peak | CPU Peak |
| --- | --- | --- | --- |
| Traditional Process | Failed (OOM) | n/a | n/a |
| New Process | 8 H | 430 GB | 50% |

The example results of Table 1 indicate that the new process (i.e., the process in accordance with implementations of the present disclosure) reduces the duration by approximately 35%, reduces memory consumption by approximately 60%, and reduces CPU load by approximately 62% over the traditional process (e.g., as depicted in FIG. 4). The example results of Table 2 indicate that the new process reduces the duration by approximately 16%, reduces memory consumption by approximately 70%, and reduces CPU load by approximately 60% over the traditional process. The example results of Table 2 indicate that the traditional process failed due to an out-of-memory (00M) condition (e.g., memory peak exceeded 1 TB of the test machine), while the new process was able to handle the third capture file.

Figure 9:
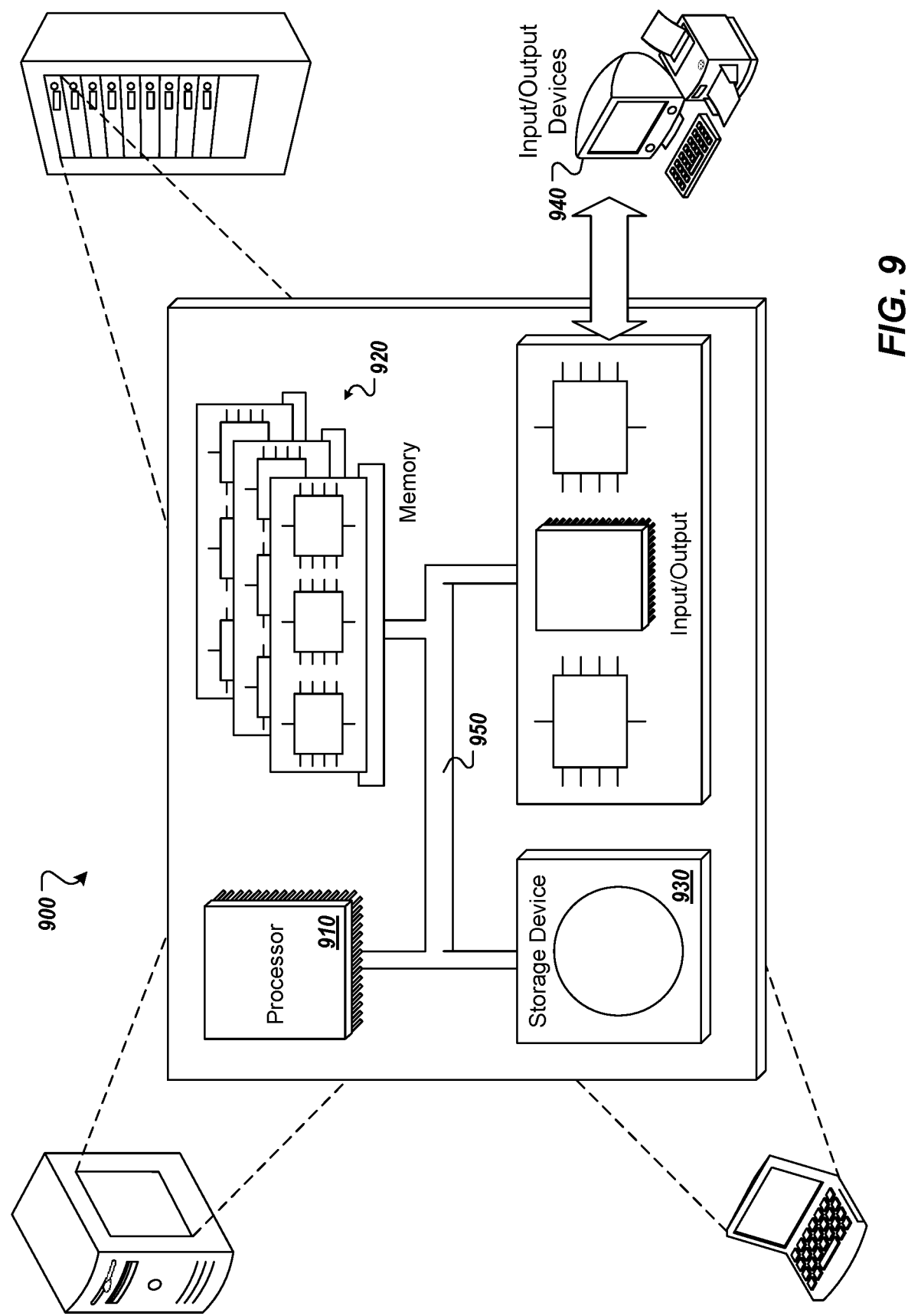
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, 940 are interconnected using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. In some implementations, the memory 920 is a volatile memory unit. In some implementations, the memory 920 is a non-volatile memory unit. The storage device 930 is capable of providing mass storage for the system 900. In some implementations, the storage device 930 is a computer-readable medium. In some implementations, the storage device 930 may be a floppy disk device, a hard disk device, an optical disk device, or a tape device. The input/output device 940 provides input/output operations for the system 900. In some implementations, the input/output device 940 includes a keyboard and/or pointing device. In some implementations, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for preprocessing of capture files for replay of a workload in a target database system, the method being executed by one or more processors and comprising:
   receiving a capture file, the capture file comprising data representative of a workload executed in a source database system; and
   processing the capture file to provide a replay file, the replay file being in a format that is executable by a replayer to replay the workload in a target database system, processing the capture file comprising:
      processing the capture file to provide a set of intermediate files, the set of intermediate files being provided as output of a writing sub-process, and
      processing the set of intermediate files using in-memory merge sort operations to generate a set of replay files, at least partially by:
         sorting, in main memory, intermediate files of the set of intermediate files to provide sets of sorted elements, and
         merging, in max heap memory, the sets of sorted elements to provide a set of globally sorted elements for inclusion in the set of replay files.

2. The method of claim 1, wherein the set of intermediate files are partially sorted in a session-wise file hierarchy based on session identifiers (IDs) of respective sessions executed during execution of the workload in the source database system.

3. The method of claim 1, wherein processing the capture file to provide the set of intermediate files at least partially comprises reading data of service files in-memory and joining at least portions of the data.

4. The method of claim 1, wherein processing the capture file to provide the set of intermediate files at least partially comprises decompressing the capture file and processing the capture file using a set of executor threads to provide a set of service files, the set of intermediate files being generated using the set of service files.

5. The method of claim 1, wherein each replay file is associated with a respective session executed during execution of the workload in the source database system based on a respective session identifier (ID).

6. The method of claim 1, further comprising executing one or more manipulations after merging a sub-set of intermediate files.

7. A non-transitory computer-readable storage medium coupled to one or more processors and having instructions stored thereon which, when executed by the one or more processors, cause the one or more processors to perform operations for preprocessing of capture files for replay of a workload in a target database system, the operations comprising:
receiving a capture file, the capture file comprising data representative of a workload executed in a source database system; and
processing the capture file to provide a replay file, the replay file being in a format that is executable by a replayer to replay the workload in a target database system, processing the capture file comprising:
processing the capture file to provide a set of intermediate files, the set of intermediate files being provided as output of a writing sub-process, and
processing the set of intermediate files using in-memory merge sort operations to generate a set of replay files, at least partially by:
sorting, in main memory, intermediate files of the set of intermediate files to provide sets of sorted elements, and
merging, in max heap memory, the sets of sorted elements to provide a set of globally sorted elements for inclusion in the set of replay files.

8. The non-transitory computer-readable storage medium of claim 7, wherein the set of intermediate files are partially sorted in a session-wise file hierarchy based on session identifiers (IDs) of respective sessions executed during execution of the workload in the source database system.

9. The non-transitory computer-readable storage medium of claim 7, wherein processing the capture file to provide the set of intermediate files at least partially comprises reading data of service files in-memory and joining at least portions of the data.

10. The non-transitory computer-readable storage medium of claim 7, wherein processing the capture file to provide the set of intermediate files at least partially comprises decompressing the capture file and processing the capture file using a set of executor threads to provide a set of service files, the set of intermediate files being generated using the set of service files.

11. The non-transitory computer-readable storage medium of claim 7, wherein each replay file is associated with a respective session executed during execution of the workload in the source database system based on a respective session identifier (ID).

12. The non-transitory computer-readable storage medium of claim 7, wherein operations further comprise executing one or more manipulations after merging a sub-set of intermediate files.

13. A system, comprising:
a computing device; and
a computer-readable storage device coupled to the computing device and having instructions stored thereon which, when executed by the computing device, cause the computing device to perform operations for preprocessing of capture files for replay of a workload in a target database system, the operations comprising:
receiving a capture file, the capture file comprising data representative of a workload executed in a source database system; and
processing the capture file to provide a replay file, the replay file being in a format that is executable by a replayer to replay the workload in a target database system, processing the capture file comprising:
processing the capture file to provide a set of intermediate files, the set of intermediate files being provided as output of a writing sub-process, and
processing the set of intermediate files using in-memory merge sort operations to generate a set of replay files, at least partially by:
sorting, in main memory, intermediate files of the set of intermediate files to provide sets of sorted elements, and
merging, in max heap memory, the sets of sorted elements to provide a set of globally sorted elements for inclusion in the set of replay files.

14. The system of claim 13, wherein the set of intermediate files are partially sorted in a session-wise file hierarchy based on session identifiers (IDs) of respective sessions executed during execution of the workload in the source database system.

15. The system of claim 13, wherein processing the capture file to provide the set of intermediate files at least partially comprises reading data of service files in-memory and joining at least portions of the data.

16. The system of claim 13, wherein processing the capture file to provide the set of intermediate files at least partially comprises decompressing the capture file and processing the capture file using a set of executor threads to provide a set of service files, the set of intermediate files being generated using the set of service files.

17. The system of claim 13, wherein each replay file is associated with a respective session executed during execution of the workload in the source database system based on a respective session identifier (ID).

* * * * *